US008763700B2

(12) United States Patent
McDaniel et al.

(10) Patent No.: US 8,763,700 B2
(45) Date of Patent: Jul. 1, 2014

(54) DUAL FUNCTION PROPPANTS

(76) Inventors: Robert Ray McDaniel, Cypress, TX (US); Avis Lloyd McCrary, Montgomery, TX (US)

(*) Notice: Subject to any disclaimer, the term of this patent is extended or adjusted under 35 U.S.C. 154(b) by 311 days.

(21) Appl. No.: 13/224,726

(22) Filed: Sep. 2, 2011

(65) Prior Publication Data
US 2013/0056204 A1    Mar. 7, 2013

(51) Int. Cl.
*E21B 43/04* (2006.01)
*E21B 43/267* (2006.01)
*C09K 8/80* (2006.01)

(52) U.S. Cl.
USPC .......... 166/280.1; 166/51; 166/265; 166/278; 166/279; 166/312; 507/269; 507/924; 507/926

(58) Field of Classification Search
None
See application file for complete search history.

(56) References Cited

U.S. PATENT DOCUMENTS

| | | | |
|---|---|---|---|
| 2,823,753 A | 2/1958 | Henderson | |
| 3,026,938 A | 9/1958 | Huitt | |
| 3,805,531 A | 4/1974 | Kistner | |
| 3,929,191 A | 12/1975 | Graham | |
| 3,976,135 A | 8/1976 | Anderson | |
| 4,074,760 A | 2/1978 | Copeland | |
| 4,113,014 A | 9/1978 | Kubens | |
| 4,199,484 A | 4/1980 | Murphey | |
| 4,273,910 A | 6/1981 | Lederer | |
| 4,443,347 A | 4/1984 | Underdown | |
| 4,518,039 A | 5/1985 | Graham | |
| 4,785,884 A | 11/1988 | Armbruster | |
| 4,920,192 A | 4/1990 | Wiser-Halladay | |
| 5,048,608 A | 9/1991 | Wiser-Halladay | |
| 5,188,175 A | 2/1993 | Sweet | |
| 5,199,491 A | 4/1993 | Kutta | |
| 5,256,729 A | 10/1993 | Kutta | |
| 5,582,249 A | 12/1996 | Caveny | |
| 5,721,315 A | 2/1998 | Evans | |
| 5,733,952 A | 3/1998 | Geoffrey | |
| 5,924,488 A | 7/1999 | Nguyen | |
| 6,079,492 A | 6/2000 | Hoogteijling | |
| 6,093,469 A | 7/2000 | Callas | |
| 6,114,410 A | 9/2000 | Betzold | |
| 6,306,964 B1 | 10/2001 | Evans | |
| 6,387,501 B1 | 5/2002 | McCrary | |
| 6,406,789 B1 | 6/2002 | McDaniel | |
| 6,528,157 B1 | 3/2003 | Hussain | |
| 6,582,819 B2 | 6/2003 | McDaniel | |
| 6,632,527 B1 | 10/2003 | McDaniel | |
| 6,668,926 B2 | 12/2003 | Nguyen | |
| 6,705,400 B1 | 3/2004 | Nguyen | |
| 6,866,099 B2 | 3/2005 | Nguyen | |
| 7,012,043 B2 | 3/2006 | Klein | |
| 7,078,442 B2 | 7/2006 | Brown | |
| 7,135,231 B1 | 11/2006 | Sinclair | |
| 7,153,575 B2 | 12/2006 | Anderson | |
| 7,216,711 B2 | 5/2007 | Nguyen | |
| 7,261,156 B2 | 8/2007 | Nguyen | |
| 7,270,879 B2 | 9/2007 | McCrary | |
| 7,281,581 B2 | 10/2007 | Nguyen | |
| 7,318,472 B2 | 1/2008 | Smith | |
| 7,318,474 B2 | 1/2008 | Welton | |
| 7,322,411 B2 | 1/2008 | Brannon | |
| 7,334,635 B2 | 2/2008 | Nguyen | |
| 7,343,973 B2 | 3/2008 | Dusterhoft | |
| 7,350,571 B2 | 4/2008 | Nguyen | |
| 7,407,010 B2 | 8/2008 | Rickman | |
| 7,528,096 B2 | 5/2009 | Brannon | |
| 7,624,802 B2 | 12/2009 | McCrary | |
| 7,721,804 B2 | 5/2010 | Duenckel | |
| 7,726,399 B2 | 6/2010 | Brannon | |
| 7,754,659 B2 | 7/2010 | Rediger | |
| 7,772,163 B1 | 8/2010 | Brannon | |
| 7,789,147 B2 | 9/2010 | Brannon | |
| 7,919,183 B2 | 4/2011 | McDaniel | |
| 2002/0048676 A1 | 4/2002 | McDaniel | |
| 2003/0131998 A1 | 7/2003 | Nguyen | |
| 2003/0224165 A1 | 12/2003 | Anderson | |
| 2005/0019574 A1 | 1/2005 | McCrary | |
| 2007/0021309 A1 | 1/2007 | Bicerano | |
| 2007/0034373 A1 | 2/2007 | McDaniel | |
| 2007/0161515 A1 | 7/2007 | Bicerano | |
| 2007/0204992 A1 | 9/2007 | Davis | |
| 2007/0208156 A1 | 9/2007 | Posey | |
| 2007/0209794 A1 | 9/2007 | Kaufman | |

(Continued)

FOREIGN PATENT DOCUMENTS

WO    2010/049467    5/2010

OTHER PUBLICATIONS

The removal of heavy metal cations by natural zeolites, http://www.resultsrna.com/research/zeolite_binds_heavy_metals.php, pp. 3-7.
Wingenfelder, Ulla et al., Removal of Heavy Metals from Mine Waters by Natural Zeolites, Environ. Sci. Technol., 2005, vol. 39, 4606-4613.
Halimoon, Normala, Removal of Heavy Metals from Textile Wastewater Using Zeolite, EnvironmentAsia 3(special issue) 2010, 124-130.
Wikipedia, Methylene diphenyl diisocyanate, http://en.wikipedia.org/wiki/Methylene_diphenyl_diisocyanate.

(Continued)

*Primary Examiner* — Zakiya W Bates

(57) ABSTRACT

Proppants for use in fractured or gravel packed/frac packed oil and gas wells are provided with a contaminant removal component to remove one or more of the contaminants found in subterranean water/hydrocarbon from a production well. The water/hydrocarbon cleaning proppant solids may be used as discrete particles in a proppant formulation, as a coating on proppant solids in pores of a porous proppant solid or as part of the proppant's internal structure. The contaminant removal component removes contaminants, especially dissolved contaminants, in the subterranean water or hydrocarbon before the water/hydrocarbon leaves the well. For those contaminant removal components that can be regenerated, such as ion exchange resins, a measured quantity of an acidic regeneration solution can be injected into the fractured stratum for regeneration and recovered when the well resumes production.

15 Claims, No Drawings

(56) References Cited

U.S. PATENT DOCUMENTS

| | | |
|---|---|---|
| 2007/0215354 A1 | 9/2007 | Rickman |
| 2008/0202744 A1 | 8/2008 | Crews |
| 2008/0202750 A1 | 8/2008 | Rediger |
| 2008/0230223 A1 | 9/2008 | McCrary |
| 2009/0238988 A1 | 9/2009 | McDaniel |
| 2010/0065271 A1 | 3/2010 | McCrary |
| 2010/0286000 A1 | 11/2010 | Huang |
| 2011/0162837 A1 | 7/2011 | O'Malley |
| 2011/0244125 A1 | 10/2011 | Weisenberg |
| 2011/0272146 A1 | 11/2011 | Green |
| 2011/0297383 A1 | 12/2011 | Tanguay |
| 2012/0018162 A1 | 1/2012 | Tanguay |

OTHER PUBLICATIONS

Carbo Ceramics, Topical Reference, Physical Properties of Proppants, pp. 1-5.

Huntsman, Performance products JEFFCAT catalysts for the Polyurethane Industry—Asia-Pacific, pp. 1-6.

Huntsman, JEFFCAT Amine Catalysts for the Polyurethane Industry—Americas Region.

Sanchez, Mariano, FRAC Packing: Fracturing for Sand Control, Middle East and Asia Reservoir Review, Nov. 8, 2007, pp. 37-49.

Interstate Oil and Gas Compact Commission and ALL Consulting, A Guide to Practical Management of Produced Water from Onshore Oil and Gas Operations in the United States, Oct. 2006.

Boster, Ronald S., A Study of Ground-Water Contamination Due to Oil-Field Brines in Morrow and Delaware Counties, Ohio, With Emphasis on Detection Utilizing Electrical Resistivity Techniques, The Ohio State University, 1967.

EPA, Oil and Gas Extraction, Compliance and Enforcement History, Sector Notebook Project, Oct. 2000, pp. 115-155.

Huntsman, The JEFFAMINE Polyetheramines, 2007.

HUI, Removal of mixed heavy metal ions in wastewater by zeolite 4A and residual products from recycled coal fly ash, Journal of Hazardous Materials, Aug. 1, 2005, vol. B127, pp. 89-101.

International Search Report and Written Opinion issued in PCT/US2012/053277 dated Nov. 20, 2012.

Wikipedia, Piezoelectricity, en.wikipedia.org.wiki/Piezoelectricity, pp. 1-15.

Wikipedia, Ion-exchange resin, en.wikipedia.org/wiki/Ion_exchange_resins, pp. 1-5.

DUAL FUNCTION PROPPANTS

FIELD OF INVENTION

The invention relates to a method for the removal of dissolved contaminants, especially heavy metals and naturally occurring radioactive materials (NORMs), in water and hydrocarbons produced from a fractured oil or gas well as well as the composition, method of production and methods for using the proppant composition in well fracturing and production.

BACKGROUND OF THE INVENTION

Hydraulic fracturing is an often used technique to increase the efficiency and productivity of oil and gas wells. Overly simplified, the process involves the introduction of a water-based, oil-base or emulsion fracturing fluid into the well and the use of fluid pressure to fracture and crack the well stratum. The cracks allow the oil and gas to flow more freely from the stratum and thereby increase production rates in an efficient manner.

There are many detailed techniques involved in well fracturing, but one of the most important is the use of a solid "proppant" to keep the stratum cracks open as oil, gas, water and other fluids found in well flow through those cracks. The proppant is carried into the well with the fracturing fluid which itself may contain a variety of viscosity enhancers, gelation agents, surfactants, etc. These additives also enhance the ability of the fracturing fluid to carry proppant to the desired stratum depth and location. The fracturing fluid for a particular well may or may not use the same formulation for each depth in the stratum.

Water produced during oil and gas operations constitutes the industry's most prolific by-product. By volume, water production represents approximately 98 percent of the non-energy related fluids produced from oil and gas operations, yielding approximately 14 billion barrels of water annually.

According to the American Petroleum Institute (API), more than 18 billion barrels of waste fluids from oil and gas production are generated annually in the United States. Such waste materials are often dissolved in subterranean water with a ratio of produced water to oil of about 10 barrels of produced water per barrel of oil. This contaminated water may include various ionic contaminants that include salt, hydrocarbons, heavy metals (e.g., zinc, lead, manganese, boron, copper, mercury, chromium, arsenic, strontium and aluminum), corrosive acids or bases from dissolved sulfides and sulfates, scale (e.g., insoluble barium, calcium and strontium compounds), naturally-occurring radionuclides (e.g., uranium, thorium, cadmium, radium, lead-210 and decay products thereof) often referred to as Naturally Occurring Radioactive Materials (NORMS), sludge (oily, loose material often containing silica and barium compounds) and dissolved radon gas. In general, the produced waters are re-injected into deep wells or discharged into non-potable coastal waters. Excluding trucking costs, waste water disposal can cost as much as $2 per barrel. Such costs must be factored into the overall economics of a gas field.

The NORMS contaminants are a matter of particular interest. Oil and gas NORM is created in the production process, when produced fluids from reservoirs carry sulfates up to the surface of the Earth's crust. Barium, Calcium and Strontium sulfates are larger compounds, and the smaller atoms, such as Radium 226 and Radium 228 can fit into the empty spaces of the compound and be carried through the produced fluids. As the fluids approach the surface, changes in the temperature and pressure cause the Barium, Calcium, Strontium and Radium sulfates to precipitate out of solution and form scale on the inside, or on occasion, the outside of the completion string and/or casings. The use of the completion string of tubular pipes in the production process that are NORM-contaminated does not cause a health hazard if the scale is inside the tubular string and the tubular string remain downhole. Enhanced concentrations of the radium 226 and 228 and the degradation products (such as Lead 210) may also occur in sludge that accumulates in oilfield pits, tanks and lagoons. Radon gas in the natural gas streams also concentrate as NORM in gas processing activities. Radon decays to Lead 210, then to Bismuth 210, Polonium 210 and stabilizes with Lead 206. Radon decay elements occur as a shiny film on the inner surface of inlet lines, treating units, pumps and valves associated with propylene, ethane and propane processing systems.

The contaminated water produced from a well should be reused or treated to remove the contaminants, especially the heavy metals. Oil wells are not, however, typically located next to substantial water treatment facilities. The contaminated water must be captured and transported to treatment facilities or portable facilities must be brought to the well. Exemplary systems have included packed beds of activated charcoal for the removal of organic compounds, permanent or portable ion exchange columns, electrodialysis and similar forms of membrane separation, freeze/thaw separation and spray evaporation, and combinations of these. All of these options are relatively costly with the water volumes produced from a production well.

Some type of in situ treatment could be potentially very helpful to supplement or, in some instances, replace surface-based purification treatments. Pointedly, it would be desirable if a proppant composition that is passed into the fractured well stratum could provide both a crack propping function as well as an ability to remove at least some portion of the ionic and dissolved contaminants before they were produced to the surface.

One publication that suggests the use of a dual function proppant is Tanguay et al. WO 2010/049467. The proppant described in this published application has a polycarbodiimide or polyurethane coating that optionally contains organic compounds, microorganisms and petroleum processing catalysts. As the coating dissolves over a period of 4 hours, the compounds, microorganisms or catalyst are slowly released into the crude oil.

U.S. Pat. No. 6,528,157 describes a coated proppant that includes a fibrous material extending outwardly from the proppant coating. This fuzzy proppant is said to be useful for acting as a physical screen to prevent the backward flow of sand, proppants or other particles from the fractured stratum. The fibers may be any of various kinds of commercially available short fibers such as milled glass fibers, milled ceramic fibers, milled carbon fibers and synthetic fibers having a softening point above typical starting sand temperature for coating, e.g., at least about 200° F. so as to not degrade, soften or agglomerate.

U.S. Pat. No. 7,754,659 teaches the addition of magnetic particles on the outside of a proppant substrate for the purpose of enhancing the flow-back resistance of the coated proppant from the fractured subterranean stratum.

SUMMARY OF THE INVENTION

It would be desirable to have a proppant that would act as a proppant as well as perform filtering, cleaning or some other mode of contaminant removal from water found within a well, especially a well for producing oil and/or gas.

It would be desirable to have an in-situ, downhole system for removing dissolved contaminants, especially dissolved forms of heavy metals and NORMs, at depth in an oil or gas well that would be effective but not materially increase costs or change procedures at the wellhead.

These and other objectives of the invention that will become apparent from the description herein can be accomplished by a proppant solid associated with a contaminant removal component that will remove, sequester, chelate or otherwise clean at least one contaminant, especially dissolved or otherwise ionic forms of heavy metals and naturally occurring radioactive materials (NORMS), from subterranean water or hydrocarbon deposits within a fractured stratum while also propping open cracks in said fractured stratum. Preferably, the contaminant removal component is associated with the proppant solid as a chemically distinct solid that is introduced together with the proppant solid as an insoluble solid secured to the outer surface of the proppant solid with a coating formulation that binds the solids together, as a solid lodged within pores of the proppant solid or as a chemical compound or moiety that is mixed into or integrated with a coating or the structure of the proppant solid.

Dual function proppants according to the invention provide good conductivity in an oil or gas production well while also removing at least some of the impurities found in the contaminated downhole water and hydrocarbons. Such water cleaning functions increase the value of the proppant by reducing the costs and/or treatment times needed to further clean water materials discharged from an oil or gas production well.

DETAILED DESCRIPTION OF THE INVENTION

The proppant of the present invention includes a proppant formulation that comprises a contaminant removal component associated with a proppant particulate. The type of association encompasses various physical combinations of the proppant particulate and the contaminant removal component, such as (a) unified proppant particulates in which the contaminant removal component has been integrated into the structure of the proppant particulate as a chemical compound or moiety, an adsorbed liquid or finely divided solids disposed in pores within the proppant particulate, or adhered to the outside of the proppant particulate with a water insoluble binder coating; or (b) a physical blend or mixture of proppant particulates and non-proppant particulates. The best choice will depend greatly on the well, the fractured stratum and the nature of the contaminants to be removed from the produced fluids.

It will be understood that the contaminant removal component that is described herein for use with a proppant solid can also be used in the same manners with other solids that are employed in well operations. Examples of such other solids include gravel packs and sand filters of the used in well completions. The gravel packing operation includes a transport of sand into the space between the screen and the casing, and into the perforation tunnels. The sand is sized to prevent fine particles or fines from the specific formation from passing through the pack (usually 20-40 mesh or 30-50 mesh or 40-60 mesh). The sand is deposited into the annulus behind the screen and then packed to create a filter to stop the fine particulate matter or fines from migrating into the well bore. The screen openings are further sized to act as a final filter for any fines migrating through the sand bed. The contaminant removal particles of the present invention can be readily included in physical admixture with the gravel pack or filter sand particulates or adhered to them by way of a binder coating on the gravel pack or filter sand. They will perform additional contaminant removal as water and hydrocarbons issue from the fractured stratum.

The contaminant removal component or components can remove the contaminants by any chemical, physical or biological method that is effective to remove the contaminant from the subterranean water associated with a fractured well. The contaminant removal component in the proppant formulation of the invention will generally exhibit a functional affinity for the impurities in the water/hydrocarbon phase that pass through the fracture. Exemplary methods include ionic attraction, ionic exchange, sequestration, amalgamation, chelation, physical entrapment, absorption, adsorption, magnetic attraction, and adhesion. The specific method of removal that is most advantageous for a specific well depends on the nature and identities of the water contaminants that are produced from a specific well. Preferred types of contaminant removal components include ion exchange resins, zeolites, and chemical compounds.

Ion Exchange Resins

Synthetic ion exchange resins consist essentially of a crosslinked polymer network to which are attached ionized or ionizable groups. In the case of cation exchange resins, these groups are acidic groups (e.g., $-SO_3H$, $-PO_3H_2$, $-CO_2M$, and phenolic hydroxyl) while in anion exchange resins the groups are basic in character (e.g., quaternary ammonium, aliphatic or aromatic amine groups). In the synthesis of ion exchange resins, the ionizable and contaminant removal functional groups may be attached to the monomers or intermediates used in preparation of the crosslinked polymer, or they may be introduced subsequently into a preformed polymer.

Cation exchange resins are prepared by sulfonating styrene-divinylbenzene copolymers as described in U.S. Pat. No. 2,366,007. Many strongly basic anion exchange resins are prepared by treating crosslinked polystyrene with chloromethyl ether in the presence of a Friedel-Crafts catalyst. The chloromethylated product is then treated with a tertiary amine, e.g., trimethylamine, to give a resin containing strongly basic quaternary ammonium groups. The crosslinked polystyrene is generally a copolymer with up to about 10% divinylbenzene.

Suitable ion exchange resins for the present invention are generally categorized as strong acid cation exchange resins, weak acid cation exchange resins, strong base anion exchange resins, and weak base anion exchange resins.

Ion exchange resins can be physically blended with proppant solids generally within the weight ratio range of about 1000:1 to about 1:1000 of exchange resin to proppant. The specific weight ratio will depend on the relative densities of these materials, the carrying capacity of the resin and the contaminants found downhole. Generally, ion exchange resins within the range of about 10-60 mesh (250-2000 µm) are suitable for physical admixtures with proppant solids. Alternatively, ion exchange resin solids can be disposed within pore openings or bound to the proppant solid with an exterior coating, adhesive or binder that resists dissolution under downhole conditions. Ion exchange resins within the range of about 10-400 mesh (38-2000 µm) are generally suitable for such combinations. Even smaller sizes can be used to meet the requirements of small pores within the proppant particulate.

Ion exchange resins are likely to become spent as they are used to collect contaminants. These resins can be regenerated in situ by injecting an acidic solution into the fractured stratum containing the exchange resin. After a suitable recharge period, the discharge water that is laden with flushed contaminants is recovered as the well resumes production. See U.S. Pat. No. 7,896,080 whose disclosure is hereby incorporated by reference.

Molecular Sieves and Zeolites

Compositionally, zeolites are similar to clay minerals. More specifically, both are alumino-silicates. They differ, however, in their crystalline structure. Many clays have a layered crystalline structure (similar to a deck of cards) and are subject to shrinking and swelling as water is absorbed and removed between the layers. In contrast, zeolites have a rigid, 3-dimensional crystalline structure (similar to a honeycomb) consisting of a network of interconnected tunnels and cages. Water moves freely in and out of these pores but the zeolite framework remains rigid. Another special aspect of this structure is that the pore and channel sizes are nearly uniform, allowing the crystal to act as a molecular sieve. The porous zeolite is host to water molecules and ions of potassium and calcium, as well as a variety of other positively charged ions, but only those of appropriate molecular size to fit into the pores are admitted creating the "sieving" property.

One important property of zeolite is the ability to exchange cations. This is the trading of one charged ion for another on the crystal. One measure of this property is the cation exchange capacity. Zeolites have high cation exchange capacities, arising during the formation of the zeolite from the substitution of an aluminum ion for a silicon ion in a portion of the tetrahedral units that make up the zeolite crystal. See U.S. Pat. Nos. 2,653,089; 5,911,876; 7,326,346; 7,884,043 and Published US Patent Application Nos. 2004/010267 and 2005/018193. Other molecular sieves and adsorbents have been synthesized that appear to work well with NORMS-type contaminants. See U.S. Pat. Nos. 7,332,089 and 7,537,702. The disclosures of each of these references are hereby incorporated by reference.

Suitable molecular sieves and zeolites for use in the present invention include pretreated or untreated natural and synthetic molecular sieves with pore size and exchange characteristics suitable for the contaminant to be removed, e.g., heavy metals. Examples of such zeolites include aluminosilicates such as clinoptilolite, modified clinoptilolite per U.S. Pat. No. 7,074,257, vermiculite, montmorillonite, bentonite, chabazite, heulandite, stilbite, natrolite, analcime, phillipsite, permatite, hydrotalcite, zeolites A, X, and Y; antimonysilicates; silicotitanates; and sodium titanates.

Chemicals

Porous proppant particulates can be impregnated with one or more chemical compounds that have an affinity for binding with the contaminant targeted for removal. Examples of chemical compounds with an affinity for different contaminants include sulfonic acids, carboxylic acids, phenolics, aminoacids, glycolamines, polyamines, quaternary amines, polyhydroxylic compounds, and combinations thereof. This functionality should be primarily available at the surface of the coated particles to enhance contact with the ionic contaminant species and removal from solution.

Other Contaminant Removal Components

In addition to the above, contaminants from water and hydrocarbons found in a fractured stratum can include activated carbon, non-molecular sieve adsorbent solids with an affinity for heavy metals and reactive materials that will form insoluble complexes or amalgams with the targeted metal ion contaminant species.

Proppant Solids

Proppant solids can be virtually any small solid or porous with an adequate crush strength and lack of chemical reactivity. Suitable examples include sand, ceramic particles (such as aluminum oxide, silicon dioxide, titanium dioxide, zinc oxide, zirconium dioxide, cerium dioxide, manganese dioxide, iron oxide, calcium oxide or bauxite) which may or may not embody the contaminant removal component as an integral component of the ceramic matrix or structure, or also other granular materials. Proppant materials that have been widely used include: (1) particulate sintered ceramics, typically aluminum oxide, silica, or bauxite, often with clay-like binders or other additives to increase the particulate's compressive strength, especially sintered bauxite; (2) natural, relatively coarse, sand, the particles of which are roughly spherical, generally called "frac sand"; (3) resin-coated particulates of these materials and (4) composite particles or composite particles containing a solid or porous solid core in which the contaminant removal agent is an integral part of the solid core or disposed within pores of the porous solid core. The proppants to be coated preferably have an average particle size within the range from about 50 μm and about 3000 μm, and more preferably within the range from about 100 μm to about 2000 μm.

The proppant should have a distribution of particles having sizes in the range of from about 4 mesh to about 100 mesh (U.S. Standard Sieve numbers), i.e., the particles pass through a screen opening of about 4760 microns (4 mesh) and are retained on a screen opening of about 150 microns (100 mesh). Preferred proppants have a distribution of particle sizes in which 90% are within the range of 8 mesh to 100 mesh, and more usually in the range of 16 mesh to 70 mesh. Particularly preferred proppants have a distribution of particle sizes with at least 90% by weight of the particles having a size within a desired range, such as the range of 20 mesh to 40 mesh, i.e., between about 850 and about 425 microns.

Coatings

A coating can be used to provide exposed surface moieties of the types noted above that have an affinity for removing contaminants or the coating can be used as an insoluble binder to secure or adhere a particulate contaminant removal component to the outer surface of the proppant solid. Coatings can be cured, partially cured or uncured and are intended to secure the contaminant removal component to the proppant solid. Which of these forms is most desirable for a particular well will depend on the coating, its dissolution characteristics in the downhole environment, and the nature of the cleaning component.

Coatings used to bind the contaminant removal agent and the proppant solid can use virtually any coating formulation but preferably use coating formulations previously used to help consolidate or improve the strength of the proppant within the fractured stratum and resist washout. Thermoset and thermoplastic resins are common. Hot melt adhesives have been proposed for use based on a theory of operation that the coating on the proppant will exhibit a latent tackiness, i.e., the tackiness of the coating does not develop until the proppant is placed into the hydrocarbon-bearing formation. Within the downhole environment, the subterranean heat causes the adhesive to become tacky so that aggregation occurs as the coating softens to cause the tacky adhesive thermoplastic to produce stable agglomerates within the fractured subterranean formation.

Resin coated proppants come in three types: precured, partially cured and curable. Precured resin coated proppants comprise a substrate coated with a resin which has been significantly crosslinked. The resin coating of the precured proppants provides crush resistance to the substrate. Since the resin coating is already cured before it is introduced into the well, even under high pressure and temperature conditions, the proppant does not agglomerate is capable of generating substantial particle to particle bond strength. Such precured resin coated proppants are typically held in the fracture by the stress surrounding them. The resin coating of a partially cured proppant has been partially reacted during the manufacturing process but retains a significant level of curability. The resin coating of the curable proppants is not significantly crosslinked or cured before injection into the oil or gas well. The partially cured and curable coatings are designed to crosslink under the stress and temperature conditions existing in the well formation. This causes the proppant particles to bond together forming a 3-dimensional matrix and preventing proppant flow-back.

Suitable coatings include 0.1-10 wt % of a cured, partially cured or curable organic polymer, prepolymer, and oligomer of resole or novolac type. The specific chemistries of such organic coatings can be chosen from a wide selection, including epoxy, phenolic, polyurethane, polycarbodiimide, furan resins and combinations of these with each other. The phenolics of the above-mentioned novolac or resole polymers may be phenol moieties or bis-phenol moieties. Novolac resins are preferred. Specific thermoplastics include polyethylene, acrylonitrile-butadiene styrene, polystyrene, polyvinyl chloride, fluoroplastics, polysulfide, polypropylene, styrene acrylonitrile, nylon, and phenylene oxide. Specific thermosets include epoxy, phenolic, e.g., resole (a true thermosetting resin) or novolac (thermoplastic resin which is rendered thermosetting by a hardening agent), polyester resin, polyurethanes and derivatives thereof, and epoxy-modified novolac. The phenolic resin comprises any of a phenolic novolac polymer; a phenolic resole polymer; a combination of a phenolic novolac polymer and a phenolic resole polymer; a cured combination of phenolic/furan resin or a furan resin to form a precured resin.

A preferred proppant coating for use in the present invention includes a substantially homogeneous mixture that comprises: (a) an isocyanate reactant, (b) a polyol reactant which may or may not have reactive amine functionality, (c) optionally, an amine reactant that is different from the polyol reactant, and (d) optionally, an amine-based, latent curing agent. A typical proppant resin is a phenolic novolac resin coating composition combined with hexamethylenediaminetetramine (HEXA), formaldehyde, paraformaldehyde, oxazolidines, phenol-aldehyde resole polymers and/or other known curing agents as a cross-linking agent to achieve a precured or curable proppant.

The coating process of the present invention applies one or more layers of substantially cured polyurethane around a solid proppant core. The coating is cured and crosslinked to the point that it can resist dissolution under the rigorous combination of high heat, agitation, abrasion and water found downhole in a well. Preferably, the substantially cured coating exhibits a sufficient resistance to a 10 day autoclave test or 10 day conductivity test so that the coating resists loss by dissolution in hot water ("LOI loss") of less than 25 wt %, more preferably less than 15 wt %, and even more preferably a loss of less than 5 wt %. The substantially cured coating of the invention thus resists dissolution in the fractured stratum while also exhibiting sufficient resistance to flow back and sufficiently high crush strength to maintain conductivity of the fractures.

A preferred testing method for is described in ISO 13503-5:2006(E) "Procedures for measuring the long term conductivity of proppants", the disclosure of which is herein incorporated by reference. ISO 13503-5:2006 provides standard testing procedures for evaluating proppants used in hydraulic fracturing and gravel packing operations. ISO 13503-5:2006 provides a consistent methodology for testing performed on hydraulic fracturing and/or gravel packing proppants. The "proppants" mentioned henceforth in this part of ISO 13503-5:2006 refer to sand, ceramic media, resin-coated proppants, gravel packing media, and other materials used for hydraulic fracturing and gravel-packing operations. ISO 13503-5:2006 is not applicable for use in obtaining absolute values of proppant pack conductivities under downhole reservoir conditions, but it does serve as a consistent method by which such downhole conditions can be simulated and performance properties of proppant compared in a laboratory setting.

The isocyanate component comprises an isocyanate with at least 2 reactive isocyanate groups. Other isocyanate-containing compounds may be used, if desired. Examples of suitable isocyanate with at least 2 isocyanate groups an aliphatic or an aromatic isocyanate with at least 2 isocyanate groups (e.g. a diisocyanate, triisocyanate or tetraisocyanate), or an oligomer or a polymer thereof can preferably be used. These isocyanates with at least 2 isocyanate groups can also be carbocyclic or heterocyclic and/or contain one or more heterocyclic groups.

The isocyanate with at least 2 isocyanate groups is preferably a compound of the formula (III) or a compound of the formula (IV):

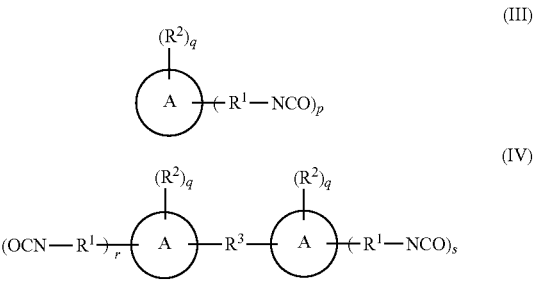

In the formulas (III) and (IV), A is each, independently, an aryl, heteroaryl, cycloalkyl or heterocycloalkyl. Preferably, A is each, independently, an aryl or cycloalkyl. More preferably A is each, independently, an aryl which is preferably phenyl, naphthyl or anthracenyl, and most preferably phenyl. Still more preferably A is a phenyl.

The above mentioned heteroaryl is preferably a heteroaryl with 5 or 6 ring atoms, of which 1, 2 or 3 ring atoms are each, independently, an oxygen, sulfur or nitrogen atom and the other ring atoms are carbon atoms. More preferably the heteroaryl is selected among pyridinyl, thienyl, furyl, pyrrolyl, imidazolyl, pyrazolyl, pyrazinyl, pyrimidinyl, pyridazinyl, oxazolyl, isoxazolyl or furazanyl.

The above mentioned cycloalkyl is preferably a $C_{3-10}$-cycloalkyl, more preferably a $C_{5-7}$-cycloalkyl.

The above mentioned heterocycloalkyl is preferably a heterocycloalkyl with 3 to 10 ring atoms (more preferably with 5 to 7 ring atoms), of which one or more (e.g. 1, 2 or 3) ring atoms are each, independently, an oxygen, sulfur or nitrogen atom and the other ring atoms are carbon atoms. More preferably the heterocycloalkyl is selected from among tetrahydrofuranyl, piperidinyl, piperazinyl, aziridinyl, acetidinyl, pyrrolidinyl, imidazolidinyl, morpholinyl, pyrazolidinyl, tetrahydrothienyl, octahydroquinolinyl, octahydroisoquinolinyl, oxazolidinyl or isoxazolidinyl. Still more preferably, the heterocycloalkyl is selected from among tetrahydrofuranyl, piperidinyl, piperazinyl, pyrrolidinyl, imidazolidinyl, morpholinyl, pyrazolidinyl, tetrahydrothienyl, oxazolidinyl or isoxazolidinyl.

In the formulas (III) and (IV), each $R^1$ is, independently, a covalent bond or $C_{1-4}$-alkylene (e.g. methylene, ethylene, propylene or butylene).

In the formulas (III) and (IV), each $R^2$ is each, independently, a halogen (e.g. F, Cl, Br or I), a $C_{1-4}$-alkyl (e.g. methyl, ethyl, propyl or butyl) or $C_{1-4}$-alkyoxy (e.g. methoxy, ethoxy, propoxy or butoxy). Preferably, each $R^2$ is, independently, a $C_{1-4}$-alkyl. More preferably each $R^2$ is methyl.

In the formula (IV), $R^3$ is a covalent bond, a $C_{1-4}$-alkylene (e.g. methylene, ethylene, propylene or butylene) or a group —$(CH_2)_{R31}$—O—$(CH_2)_{R32}$—, wherein R31 and R32 are each, independently, 0, 1, 2 or 3. Preferably, R3 is a —$CH_2$— group or an —O— group.

In the formula (III), p is equal to 2, 3 or 4, preferably 2 or 3, more preferably 2.

In the formulas (III) and (IV), each q is, independently, an integer from 0 to 3, preferably 0, 1 or 2. When q is equal to 0, the corresponding group A has no substitutent $R^2$, but has hydrogen atoms instead of $R^2$.

In the formula (IV), each r and s are, independently, 0, 1, 2, 3 or 4, wherein the sum of r and s is equal to 2, 3 or 4. Preferably, each r and s are, independently, 0, 1 or 2, wherein the sum of r and s is equal to 2. More preferably, r is equal to 1 and s is equal to 1.

Examples of the isocyanate with at least 2 isocyanate groups are: toluol-2,4-diisocyanate; toluol-2,6-diisocyanate; 1,5-naphthalindiisocyanate; cumol-2,4-diisocyanate; 4-methoxy-1,3-phenyldiisocyanate; 4-chloro-1,3-phenyldiisocyanate; diphenylmethane-4,4-diisocyanate; diphenylmethane-2,4-diisocyanate; diphenylmethane-2,2-diisocyanate; 4-bromo-1,3-phenyldiisocyanate; 4-ethoxy-1,3-phenyldiisocyanate; 2,4'-diisocyanate diphenylether; 5,6-dimethyl-1,3-phenyl-diisocyanate; 2,4-dimethyl-1,3-phenyldiisocyanate; 4,4-diisocyanato-diphenylether; 4,6-dimethyl-1,3-phenyldiisocyanate; 9,10-anthracene-diisocyanate; 2,4,6-toluol triisocyanate; 2,4,4'-triisocyanatodiphenylether; 1,4-tetramethylene diisocyanate; 1,6-hexamethylene diisocyanate; 1,10-decamethylene-diisocyanate; 1,3-cyclohexylene diisocyanate; 4,4'-methylene-bis-(cyclohexylisocyanate); xylol diisocyanate; 1-isocyanato-3-methyl-isocyanate-3,5,5-trimethylcyclohexane (isophorone diisocyanate); 1-3-bis(isocyanato-1-methylethyl)benzol (m-TMXDI); 1,4-bis(isocyanato-1-methylethyl)benzol (p-TMXDI); oligomers or polymers of the above mentioned isocyanate compounds; or mixtures of two or more of the above mentioned isocyanate compounds or oligomers or polymers thereof.

Particularly preferred isocyanates with at least 2 isocyanate groups are toluol diisocyanate, diphenylmethane diisocyanate, an oligomer based on toluol diisocyanate or an oligomer based on diphenylmethane diisocyanate.

A polyol component can be added to the coating formulation. The polyol component may or may not have reactive amine functionality. An especially preferred polyurethane coating is a phenolic polyurethane made with a phenolic polyol according to a patent application that was filed with the German Patent Office under no. DE 10 2010 051 817.4 on Nov. 19, 2010 and entitled "Proppant Coating Technology", the disclosure of which is herein incorporated by reference and summarized below in the context of the process of the present invention.

Another preferred polyol component for the present process comprises a phenol resin that comprises a condensation product of a phenol and an aldehyde, such as formaldehyde. The phenol resin is preferably a resole or novolak phenol resin and more preferably a benzyl ether resin.

The resole-type phenol resin can be obtained, for example, by condensation of phenol or of one or more compounds of the following formula (I), with aldehydes, preferably formaldehyde, under basic conditions.

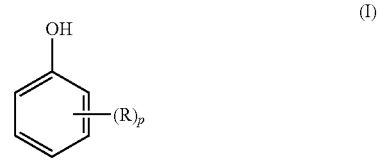

(I)

In the formula (I):
"R" is in each case, independently, a hydrogen atom, a halogen atom, $C_{1-16}$-alkyl (preferably $C_{1-12}$-alkyl, more preferably $C_{1-6}$-alkyl, and still more preferably methyl, ethyl, propyl or butyl) or —OH;
"p" is an integer from 0 to 4, preferably 0, 1, 2 or 3, and more preferably 1 or 2. Those in the art will understand that when p is 0, the compound of formula (I) is phenol.

Novolak-type phenol resin for the present invention comprises the condensation product of phenol or of one or more compounds of the formula (I) defined above, with aldehydes, preferably formaldehyde, under acidic conditions.

In another preferred embodiment, the phenol resin is a benzyl ether resin of the general formula (II):

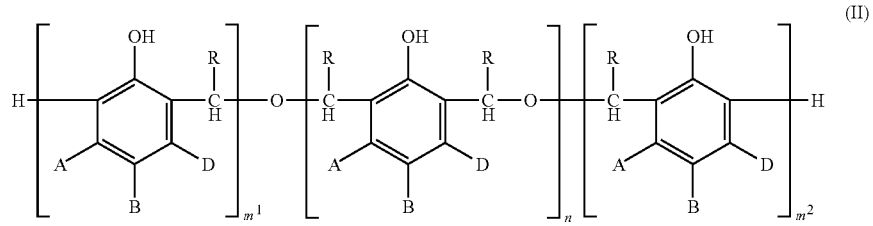

(II)

In the formula (II):
A, B and D each are, independently, a hydrogen atom, a halogen atom, a $C_{1-16}$-hydrocarbon residue, —$(C_{1-16}$-alkylene)-OH, —OH, an —O—$(C_{1-16}$-hydrocarbon residue), phenyl, —$(C_{1-6}$-alkylene)-phenyl, or —$(C_{1-6}$-alkylene)-phenylene-OH;

The halogen atom is F, Cl, Br or I;

The $C_{1-16}$-hydrocarbon-residue is preferably $C_{1-16}$-alkyl, $C_{2-16}$-alkenyl or $C_{2-16}$-alkinyl, more preferably $C_{1-12}$-alkyl, $C_{2-12}$-alkenyl or $C_{2-12}$-alkinyl, still more preferably $C_{1-6}$-alkyl, $C_{2-6}$-alkenyl or $C_{2-6}$-alkinyl, and still more preferably $C_{1-4}$-alkyl, $C_{2-4}$-alkenyl or $C_{2-4}$-alkinyl, and still more preferably $C_{1-12}$-alkyl, and still more preferably $C_{1-6}$-alkyl, and still more preferably methyl, ethyl, propyl or butyl, and most preferably methyl;

The residue —($C_{1-16}$-alkylene)-OH is preferably —($C_{1-12}$-alkylene)-OH, more preferably —($C_{1-6}$-alkylene)-OH, and still more preferably —($C_{1-4}$-alkylene)-OH, and most preferably a methylol group (—$CH_2$—OH);

The —O—($C_{1-16}$-hydrocarbon)-residue is preferably $C_{1-16}$-alkoxy, more preferably $C_{1-12}$-alkoxy, and still more preferably $C_{1-6}$-alkoxy, and still more preferably $C_{1-4}$-alkoxy, and still more preferably —O—$CH_3$, —O—$CH_2CH_3$, —O—$(CH_2)_2CH_3$ or —O—$(CH_2)_3CH_3$;

The residue —($C_{1-6}$-alkylene)-phenyl is preferably —($C_{1-4}$-alkylene)-phenyl, and more preferably —$CH_2$-phenyl;

The residue —($C_{1-6}$-alkylene)-phenylene-OH is preferably —($C_{1-4}$-alkylene)-phenylene-OH, and more preferably —$CH_2$-phenylene-OH;

R is a hydrogen atom of a $C_{1-6}$-hydrocarbon residue (e.g. linear or branched $C_{1-6}$-alkyl). R is particularly preferred as a hydrogen atom. This is the case, for example, when formaldehyde is used as aldehyde component in a condensation reaction with phenols in order to produce the benzyl ether resin of the formula (II);

$m^1$ and $m^2$ are each, independently, 0 or 1.

n is an integer from 0 to 100, preferably an integer from 1 to 50, more preferably from 2 to 10, and still more preferably from 2 to 5; and wherein the sum of n, $m^1$ and $m^2$ is at least 2.

In a still further embodiment, the polyol component is a phenol resin with monomer units based on cardol and/or cardanol. Cardol and cardanol are produced from cashew nut oil which is obtained from the seeds of the cashew nut tree. Cashew nut oil consists of about 90% anacardic acid and about 10% cardol. By heat treatment in an acid environment, a mixture of cardol and cardanol is obtained by decarboxylation of the anacardic acid. Cardol and cardanol have the structures shown below:

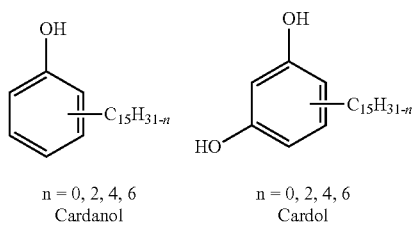

As shown in the illustration above, the hydrocarbon residue (—$C_{15}H_{31-n}$) in cardol and/or in cardanol can have one (n=2), two (n=4) or three (n=6) double bonds. Cardol specifically refers to compound CAS-No. 57486-25-6 and cardanol specifically to compound CAS-No. 37330-39-5.

Cardol and cardanol can each be used alone or at any particular mixing ratio in the phenol resin. Decarboxylated cashew nut oil can also be used.

Cardol and/or cardanol can be condensed into the above described phenol resins, for example, into the resole- or novolak-type phenol resins. For this purpose, cardol and/or cardanol can be condensed e.g. with phenol or with one or more of the above defined compounds of the formula (I), and also with aldehydes, preferably formaldehyde.

The amount of cardol and/or cardanol which is condensed in the phenol resin is not particularly restricted and preferably is from about 1 wt % to about 99 wt %, more preferably about 5 wt % to about 60 wt %, and still more preferably about 10 wt % to about 30 wt %, relative to 100 wt % of the amount of phenolic starting products used in the phenol resin.

In another embodiment, the polyol component is a phenol resin obtained by condensation of cardol and/or cardanol with aldehydes, preferably formaldehyde.

A phenol resin which contains monomer units based on cardol and/or cardanol as described above, or which can be obtained by condensation of cardol and/or cardanol with aldehydes, has a particularly low viscosity and can thus preferably be employed with a low addition or without addition of reactive thinners. Moreover, this kind of long-chain, substituted phenol resin is comparatively hydrophobic, which results in a favorable shelf life of the coated proppants obtained by the method according to the present invention. In addition, a phenol resin of this kind is also advantageous because cardol and cardanol are renewable raw materials.

Apart from the phenol resin, the polyol component can still contain other compounds containing hydroxyl groups. The other compounds containing hydroxyl groups can be selected from the compounds containing hydroxyl groups that are known to be useful for making polyurethanes, e.g., hydroxy-functional polyethers, hydroxy-functional polyesters, alcohols or glycols. One preferred compound containing hydroxyl groups is, for instance, castor oil. Compounds containing hydroxyl groups such as alcohols or glycols, in particular cardol and/or cardanol, can be used as reactive thinners.

The amount of the other compounds containing hydroxyl groups depends on the desired properties of the proppant coating and can suitably be selected by the person skilled in the art. Typical amounts of compounds containing hydroxyl groups are in the range of between about 10 wt % and about 80 wt %, preferably from about 20 wt % to about 70 wt %, relative to 100 wt % of the polyol component.

The process of the present invention is particularly useful when the proppants are coated with a condensation reaction product that has been made with an excess of isocyanate component with respect to the polyol component. In step (a) therefore, 1 part by weight of the polyol component is used at an amount within the range from about 100 wt % to about 10,000 wt %, preferably about 105 wt % to about 5,000 wt %, more preferably about 120 wt % to about 3000 wt %, and still more preferably about 130 wt % to about 1000 wt %, of the isocyanate base value.

The isocyanate base value defines the amount of the isocyanate component which is equivalent to 100 parts by weight of the polyol component. The NCO-content (%) of the isocyanate component is defined herein according to DIN ISO 53185. To determine the OH-content (%) of the polyol component, first the so-called OH-number is determined in mg KOH/g according to DIN ISO 53240 and this value is divided by 33, in order to determine the OH-content.

Moreover, in step (a) one or more additives can be mixed with the proppant, the polyol component and the isocyanate component. These additives are not particularly restricted and can be selected from the additives known in the specific field of coated proppants. Provided that one of these additives has hydroxyl groups, it should be considered as a different hydroxyl-group-containing compound, as described above in connection with the polyol component. If one of the additives has isocyanate groups, it should be considered as a different isocyanate-group-containing compound. Additives with hydroxyl groups and isocyanate groups can be simultaneously considered as different hydroxyl-group-containing compounds and as different isocyanate-group-containing compounds.

Attaching the functionality that provides the cleaning property could require an additive which is (a) reactive with the isocyanate or (b) reactive with the polyol or (c) reactive with the curing agent to be used. Thus, additives (or combinations of additives) such as ethanolamines, aminoacids, phenolsulfonic acids, salicylates, and quaternary ammonium compounds can be introduced into or into the proppant as an additive in the coating process whereby the removal component with water cleaning functionality is directly incorporated into the coating of the proppant.

It may also be possible to incorporate the removal component as an additive that already possesses the ability to clean water/hydrocarbon, wherein the coating on the proppant functions to stick the additive to the surface of the proppant, enabling the dual action of propping and water/hydrocarbon cleaning to act. Examples of this type would be a finely powdered form of commercial water treatment resins, such as anion exchange resins, cation exchange resins, and/or chelating ion exchange resins.

Alternatively, a physical blend of the coated or uncoated proppant particles and ion exchange resins beads can be used in the fracturing process as a means of introducing the combination of proppants and water/hydrocarbon cleaning activity that is required. This physical blend could consolidate in the fracture to immobilize the ion exchange resin beads, thus creating a capability to clean the fluid passing through the pack within the fracture.

A preferred proppant product would be a blend of compositionally different proppant solids and/or proppant properties. For example, some proppants would be formulated to remove one type of contaminant while other proppant solids in the blend would target a different contaminant. The ratio of a coated proppant solid blend can vary broadly within the range from about 1:1000 to 1000:1.

The coating formulation of the present invention may also include a reactive amine component that is different from the polyol reactant. Preferably, the reactive amine component is an amine-terminated compound. This component enhances crosslink density within the coating and, depending on component selection, can provide additional characteristics of benefit to the cured coating. Particularly preferred reactive amine components for use in the present invention include amine-terminated compounds such as diamines, triamines, amine-terminated glycols such as the amine-terminated polyalkylene glycols sold commercially under the trade name JEFFAMINE from Huntsman Performance Products in The Woodlands, Tex.

Suitable diamines include primary, secondary and higher polyamines and amine-terminated compounds. Suitable compounds include, but are not limited to, ethylene diamine; propylenediamine; butanediamine; hexamethylenediamine; 1,2-diaminopropane; 1,4-diaminobutane; 1,3-diaminopentane; 1,6-diaminohexane; 2,5-diamino-2,5-dimethylhexane; 2,2,4- and/or 2,4,4-trimethyl-1,6-diaminohexane; 1,11-diaminoundecane; 1,12-diaminododecane; 1,3- and/or 1,4-cyclohexane diamine; 1-amino-3,3,5-trimethyl-5-aminomethyl-cyclohexane; 2,4- and/or 2,6-hexahydrotoluoylene diamine; 2,4' and/or 4,4'-diaminodicyclohexyl methane and 3,3'-dialkyl-4,4'-diamino-dicyclohexyl methanes such as 3,3'-dimethyl-4,4-diamino-dicyclohexyl methane and 3,3'-diethyl-4,4'-diaminodicyclohexyl methane; aromatic polyamines such as 2,4- and/or 2,6-diaminotoluene and 2,6-diaminotoluene and 2,4' and/or 4,4'-diaminodiphenyl methane; and polyoxyalkylene polyamines (also referred to herein as amine terminated polyethers).

Mixtures of polyamines may also be employed in preparing aspartic esters, which is a secondary amine derived from a primary polyamine and a dialkyl maleic or fumaric acid ester, for use in the invention. Representative examples of useful maleic acid esters include dimethyl maleate, diethyl maleate, dibutyl maleate, dioctyl maleate, mixtures thereof and homologs thereof.

Suitable triamines and higher multifunctional polyamines for use in the present coating include diethylene triamine, triethylenetetramine, and higher homologs of this series.

JEFFAMINE diamines include the D, ED, and EDR series products. The D signifies a diamine, ED signifies a diamine with a predominately polyethylene glycol (PEG) backbone, and EDR designates a highly reactive, PEG based diamine.

JEFFAMINE D series products are amine terminated polypropylene glycols with the following representative structure:

$$H_2N \cdots (O)_x \cdots NH_2$$
$$CH_3 \quad CH_3$$

| JEFFAMINE ® | x | MW* |
|---|---|---|
| D-230 | ~2.5 | 230 |
| D-400 | ~6.1 | 430 |
| D-2000 | ~33 | 2,000 |
| D-4000 (XTJ-510) | ~68 | 4,000 |

JEFFAMINE EDR-148 (XTJ-504) and JEFFAMINE EDR-176 (XTJ-590) amines are much more reactive than the other JEFFAMINE diamines and triamines. They are represented by the following structure:

$$H_2N \cdots (O)_x (O)_y (O)_z \cdots NH_2$$
$$CH_3 \quad CH_3 \quad CH_3$$

| JEFFAMINE ® | y | x + z | MW* |
|---|---|---|---|
| HK-511 | 2.0 | ~1.2 | 220 |
| ED-600 (XTJ-500) | ~9.0 | ~3.6 | 600 |
| ED-900 (XTJ-501) | ~12.5 | ~6.0 | 900 |
| ED-2003 (XTJ-502) | ~39 | ~6.0 | 2,000 |

JEFFAMINE T series products are triamines prepared by reaction of propylene oxide (PO) with a triol inflator followed by amination of the terminal hydroxyl groups. They are exemplified by the following structure:

| JEFFAMINE ® | R | n | Moles PO (x + y + z) | MW* |
|---|---|---|---|---|
| T-403 | $C_2H_5$ | 1 | 5-6 | 440 |
| T-3000 (XTJ-509) | H | 0 | 50 | 3000 |
| T-5000 | H | 0 | 85 | 5000 |

The SD Series and ST Series products consist of secondary amine versions of the JEFFAMINE core products. The SD signifies a secondary diamine and ST signifies a secondary trimine. The amine end-groups are reacted with a ketone (e.g. acetone) and reduced to create hindered secondary amine end groups represented by the following terminal structure:

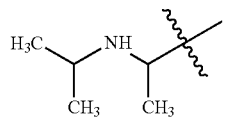

One reactive hydrogen on each end group provides for more selective reactivity and makes these secondary di- and triamines useful for intermediate synthesis and intrinsically slower reactivity compared with the primary JEFFAMINE amines.

| JEFFAMINE ® | Base Product | MW* |
|---|---|---|
| SD-231 (XTJ-584) | D-230 | 315 |
| SD-401 (XTJ-585) | D-400 | 515 |
| SD-2001 (XTJ-576) | D-2000 | 2050 |
| ST-404 (XTJ-586) | T-403 | 565 |

See also U.S. Pat. Nos. 6,093,496; 6,306,964; 5,721,315; 7,012,043; and Publication U.S. Patent Application No. 2007/0208156 the disclosure of which are hereby incorporated by reference.

An amine-based latent curing agent may optionally be added to the coating formulation with the isocyanate component, the polyol component, the amine-reactive polyol component or added simultaneously as any of these components or pre-coated on the proppant. Suitable amine-based latent curing agents for use with the present invention include triethylenediamine; bis(2-dimethylaminoethyl)ether; tetramethylethylenediamine; pentamethyldiethylenetriamine; and other tertiary amine products of alkyleneamines. Additionally, other catalysts that promote the reaction of isocyanates with hydroxyls and amines that are known by the industry can be used in the present invention.

Amine-based latent curing agents may be added in an amount within the range from about 0.1 to about 10% by weight relative to the total weight of the coating resin.

The proppant coating compositions of the invention may also include various additives. For example, the coatings of the invention may also include pigments, tints, dyes, and fillers in an amount to provide visible coloration in the coatings. Other materials conventionally included in coating compositions may also be added to the compositions of the invention. These additional materials include, but are not limited to, reaction enhancers or catalysts, crosslinking agents, optical brighteners, propylene carbonates, coloring agents, fluorescent agents, whitening agents, UV absorbers, hindered amine light stabilizers, defoaming agents, processing aids, mica, talc, nano-fillers and other conventional additives. All of these materials are well known in the art and are added for their usual purpose in typical amounts. For example, the additives are preferably present in an amount of about 15 weight percent or less. In one embodiment, the additive is present in an amount of about 5 percent or less by weight of the coating composition.

Other additives can include, for example, solvents, softeners, surface-active agents, molecular sieves for removing the reaction water, thinners and/or adhesion agents can be used. Silanes are a particularly preferred type of adhesion agent that improves the affinity of the coating resin for the surface of the proppant. Silanes can be mixed in as additives in step (a), but can also be converted chemically with reactive constituents of the polyol component or of the isocyanate component. Functional silanes such as amino-silanes, epoxy-, aryl- or vinyl silanes are commercially available and, as described above, can be used as additives or can be converted with the reactive constituents of the polyol component or of the isocyanate component. In particular, amino-silanes and epoxy-silanes can be easily converted with the isocyanate component.

The method for the production of coated proppants according to the present invention can be implemented without the use of solvents. Accordingly, the mixture obtained in step (a) in one embodiment of the method is solvent-free, or is essentially solvent-free. The mixture is essentially solvent-free, if it contains less than 20 wt %, preferably less than 10 wt %, more preferably less than 5 wt %, and still more preferably less than 3 wt %, and most preferably less than 1 wt % of solvent, relative to the total mass of components of the mixture.

In step (a) the proppant is preferably heated to an elevated temperature and then contacted with the coating components. Preferably, the proppant is heated to a temperature within the range of about 50° C. to about 150° C. to accelerate crosslinking reactions in the applied coating The mixer used for the coating process is not particularly restricted and can be selected from among the mixers known in the specific field. For example, a pug mill mixer or an agitation mixer can be used. For example, a drum mixer, a plate-type mixer, a tubular mixer, a trough mixer or a conical mixer can be used. The easiest way is mixing in a rotating drum although a continuous mixer or a worm gear can also be used.

Mixing can be carried out on a continuous or discontinuous basis. In suitable mixers it is possible, for example, to add adhesion agents, isocyanate, amine and optional ingredients continuously to the heated proppants. For example, isocyanate components, amine reactant and optional additives can be mixed with the proppant solids in a continuous mixer (such as a worm gear) in one or more steps to make one or more layers of cured coating.

Preferably, the proppant, isocyanate component, amine reactant and the optional additives are mixed homogeneously. Thus, the isocyanate component and amine reactant are distributed uniformly on the surface of the proppants. The coating ingredients are preferably kept in motion throughout the entire mixing process. It is also possible to arrange several mixers in series, or to coat the proppants in several runs in one mixer.

The temperature of the coating process is not particularly restricted outside of practical concerns for safety and component integrity. Preferably, the coating step is performed at a temperature of between about 10° C. and about 200° C., or more preferably at a temperature of about 10° C. to about 150° C.

The coating material may be applied in more than one layer. In this case, the coating process is repeated as necessary (e.g. 1-5 times, 2-4 times or 2-3 times) to obtain the desired coating thickness and/or synthetically place the water/hydrocarbon cleaning activity within layers on the coated proppant. In this manner, the thickness of the coating of the proppant can be adjusted and used as either a relatively narrow range of proppant size or blended with proppants of other sizes, such as those with more or less numbers of coating layers of polyurethane according to the present invention, so as to form a proppant blend have more than one range of size distribution. A preferred range for coated proppant is typically within the range of about 20-70 mesh.

The amount of coating resin, that is, of the polyurethane resin applied to a proppant, is preferably between about 0.5 and about 10 wt %, more preferably between about 1 and about 5 wt %, resin relative to the mass of the proppant as 100 wt %.

The coated proppants can additionally be treated with surface-active agents or auxiliaries, such as talcum powder or stearate, to improve pourability.

If desired, the coated proppants can be baked or heated for a period of time sufficient to substantially react at least substantially all of the available isocyanate, hydroxyl and reactive amine groups that might remain in the coated proppant. Such a post-coating cure may occur even if additional contact time with a catalyst is used after a first coating layer or between layers. Typically, the post-coating cure step is performed like a baking step at a temperature within the range from about 100°-200° C. for a time of about 0.5-12 hours, preferably the temperature is about 125°-175° C. for 0.25-2 hours. Even more preferably, the coated proppant is cured for a time and under conditions sufficient to produce a coated proppant that exhibits a loss of coating of less than 25 wt %, preferably less than 15 wt %, and even more preferably less than 5 wt % when tested according to ISO 13503-5:2006(E).

With the method according to the present invention proppants can be coated at temperatures between about 10° C. and about 200° C., preferably in a solvent-free manner, and combined with a contaminant removal component such as a NORMS or heavy metal ion exchange or zeolitic material, to effect both stratum fracturing and a measure of contaminant removal from the produced water and hydrocarbons while also reducing proppant flowback.

Using the Contaminant Removal Proppant Formulation

Furthermore, the invention includes the use of the contaminant removal proppant formulation in conjunction with a fracturing liquid for the production of petroleum or natural gas. The fracturing liquid is not particularly restricted and can be selected from among the frac liquids known in the specific field. Suitable fracturing liquids are described, for example, in W C Lyons, G J Plisga, *Standard Handbook Of Petroleum And Natural Gas Engineering*, Gulf Professional Publishing (2005). The fracturing liquid can be, for example, water gelled with polymers, an oil-in-water emulsion gelled with polymers, a water-in-oil emulsion gelled with polymers or gelled/ungelled hydrocarbon. In one preferred embodiment, the fracturing liquid comprises the following constituents in the indicated proportions: 1000 l water, 20 kg potassium chloride, 0.120 kg sodium acetate, 3.6 kg guar gum (water-soluble polymer), sodium hydroxide (as needed) to adjust a pH-value from 9 to 11, 0.120 kg sodium thiosulfate, and 0.180 kg ammonium persulfate.

In addition, the invention relates to a method for the production of petroleum or natural gas which comprises the injection of the coated proppant into the fractured stratum with the fracturing liquid, i.e., the injection of a fracturing liquid which contains the coated proppant, into a petroleum- or natural gas-bearing rock layer, and/or its introduction into a fracture in the rock layer bearing petroleum or natural gas. The method is not particularly restricted and can be implemented in the manner known in the specific field.

When the method of cleaning the water/hydrocarbon makes it most efficient to use a physical blend of the proppant and one or more commercial ion exchange resins or zeolites, these blends can be produced at the manufacturing site of the proppant coating process or completed at the wellbore during the fracturing process.

Once those skilled in the art are taught the invention, many variations and modifications are possible without departing from the inventive concepts disclosed herein. The invention, therefore, is not to be restricted except in the spirit of the appended claims.

What is claimed:

1. A method to remove heavy metals from contaminated water and hydrocarbons in a fractured well stratum, said method comprising: introducing into said stratum a proppant formulation that comprises solid proppant particulates associated with a contaminant removal component in a sufficient quantity to remove at least a portion of the heavy metal contaminants or other targeted contaminants in said contaminated fluids, wherein said contaminant removal component comprises (a) a substantially insoluble coating on said proppant particulates that comprises a contaminant removal chemical moiety with a functional affinity for impurities in said stratum and comprising at least one sulfonic acid moiety, carboxylic acid moiety, phenolic moiety, aminoacid moiety, glycolamine moiety, polyamine moiety, quaternary amine moiety, or polyhydroxylic moiety, and/or (b) second particulates comprising an ion exchange resin or a molecular sieve that is bound to an outer surface of said proppant particulate with a substantially insoluble coating.

2. A method according to claim 1 wherein said second discrete particulate solid is a natural molecular sieve.

3. A method according to claim 1 wherein said second discrete particulate solid is a synthetic molecular sieve.

4. A method according to claim 1 wherein said second discrete particulate solid is an ion exchange resin.

5. A method according to claim 1 wherein said removal component is disposed in pores of said solid proppant particulates.

6. A proppant formulation useful for removing heavy metals from water and hydrocarbons to be produced from a fractured oil and gas production well strata, said proppant formulation comprising: (a) a plurality of particulate proppant solids associated with (b) a contaminant removal component in sufficient quantity to remove at least a portion of heavy metal contaminants in water and hydrocarbons produced from the fractured well stratum, wherein said contaminant removal component comprises (a) a substantially insoluble coating on said proppant particulates that comprises a contaminant removal chemical moiety with a functional affinity for impurities in said stratum and comprising at least one sulfonic acid moiety, carboxylic acid moiety, phenolic moiety, aminoacid moiety, glycolamine moiety, polyamine moiety, quaternary amine moiety, or polyhydroxylic moiety, and/or (b) second particulates comprising an ion exchange resin or a molecular sieve that is bound to an outer surface of said proppant particulate with a substantially insoluble coating.

7. A proppant formulation according to claim 6 wherein said particulate proppant solids comprise pores in which said removal component is disposed in at least a portion thereof.

8. A proppant formulation according to claim 6 wherein said particulate proppant solids comprise an insoluble proppant coating.

9. A proppant formulation according to claim 6 wherein said contaminant removal component is a second discrete particulate solid that is bound to an outer surface of said proppant particulate with said coating.

10. A proppant formulation according to claim 9 wherein said second discrete particulate solid is a natural molecular sieve.

11. A proppant formulation according to claim 9 wherein said second discrete particulate solid is a synthetic molecular sieve.

12. A proppant formulation according to claim 9 wherein said second discrete particulate solid is an ion exchange resin.

13. A proppant formulation according to claim 6 wherein said contaminant removal component has a cation exchange capacity for removing normally radioactive heavy metals from said water and hydrocarbons.

14. A method to remove heavy metals from contaminated water and hydrocarbons in a fractured well stratum, said method comprising: introducing into a well a gravel pack or filter sand bed solid particulates associated with a contaminant removal component in a sufficient quantity to remove at least a portion of the heavy metal contaminants in said contaminated water and hydrocarbons, wherein said contaminant removal component comprises (a) a substantially insoluble coating on said proppant particulates that comprises a contaminant removal chemical moiety with a functional affinity for impurities in said stratum and comprising at least one sulfonic acid moiety, carboxylic acid moiety, phenolic moiety, aminoacid moiety, glycolamine moiety, polyamine moiety, quaternary amine moiety, or polyhydroxylic moiety, and/or (b) second particulates comprising an ion exchange resin or a molecular sieve that is bound to an outer surface of said proppant particulate with a substantially insoluble coating.

15. A gravel pack or filter sand formulation useful for removing heavy metals from water and hydrocarbons to be produced from a fractured oil and gas production well strata, said gravel pack or filter sand formulation comprising: (a) a plurality of particulate solids associated with (b) a contaminant removal component in sufficient quantity to remove at least a portion of heavy metal contaminants in water and hydrocarbons produced from the fractured well stratum, wherein said contaminant removal component comprises (a) a substantially insoluble coating on said proppant particulates that comprises a contaminant removal chemical moiety with a functional affinity for impurities in said stratum and comprising at least one sulfonic acid moiety, carboxylic acid moiety, phenolic moiety, aminoacid moiety, glycolamine moiety, polyamine moiety, quaternary amine moiety, or polyhydroxylic moiety, and/or (b) second particulates comprising an ion exchange resin or a molecular sieve that is bound to an outer surface of said proppant particulate with a substantially insoluble coating.

* * * * *